Feb. 10, 1931.  B. D. HORTON  1,792,425
BRANCH FUSED CUT-OUT BLOCK
Original Filed Feb. 23, 1924  2 Sheets-Sheet 1
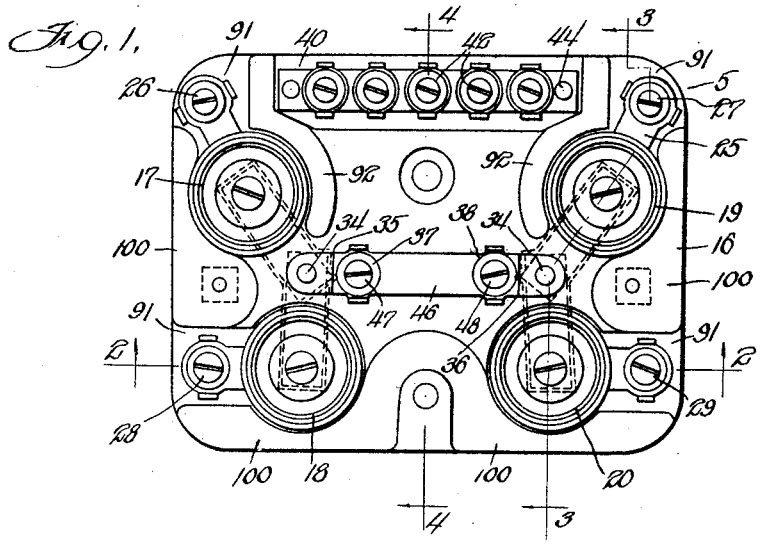
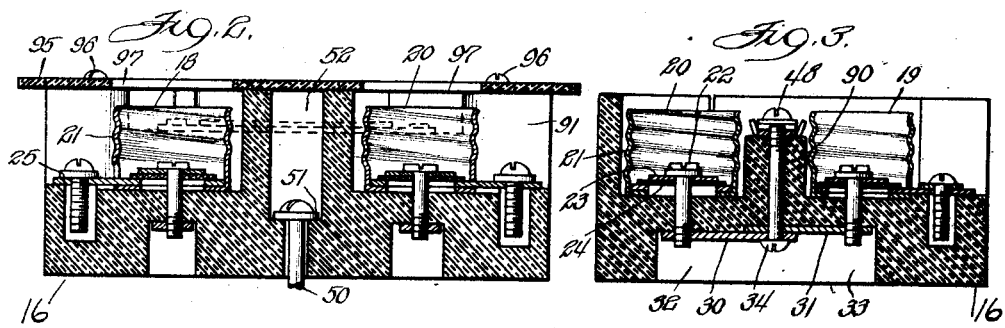
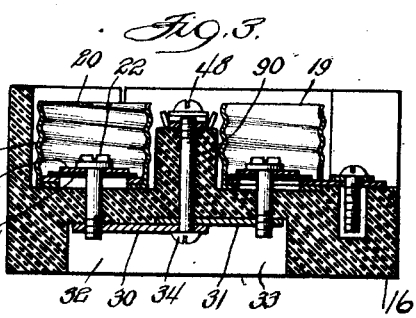
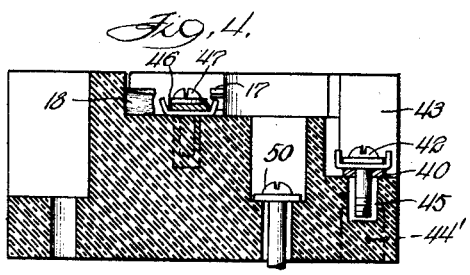
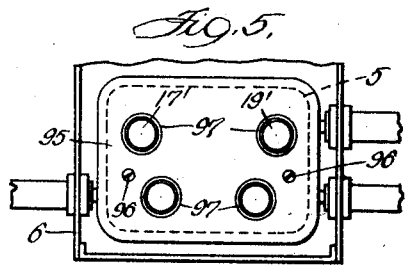
Inventor:
BRYSON D. HORTON

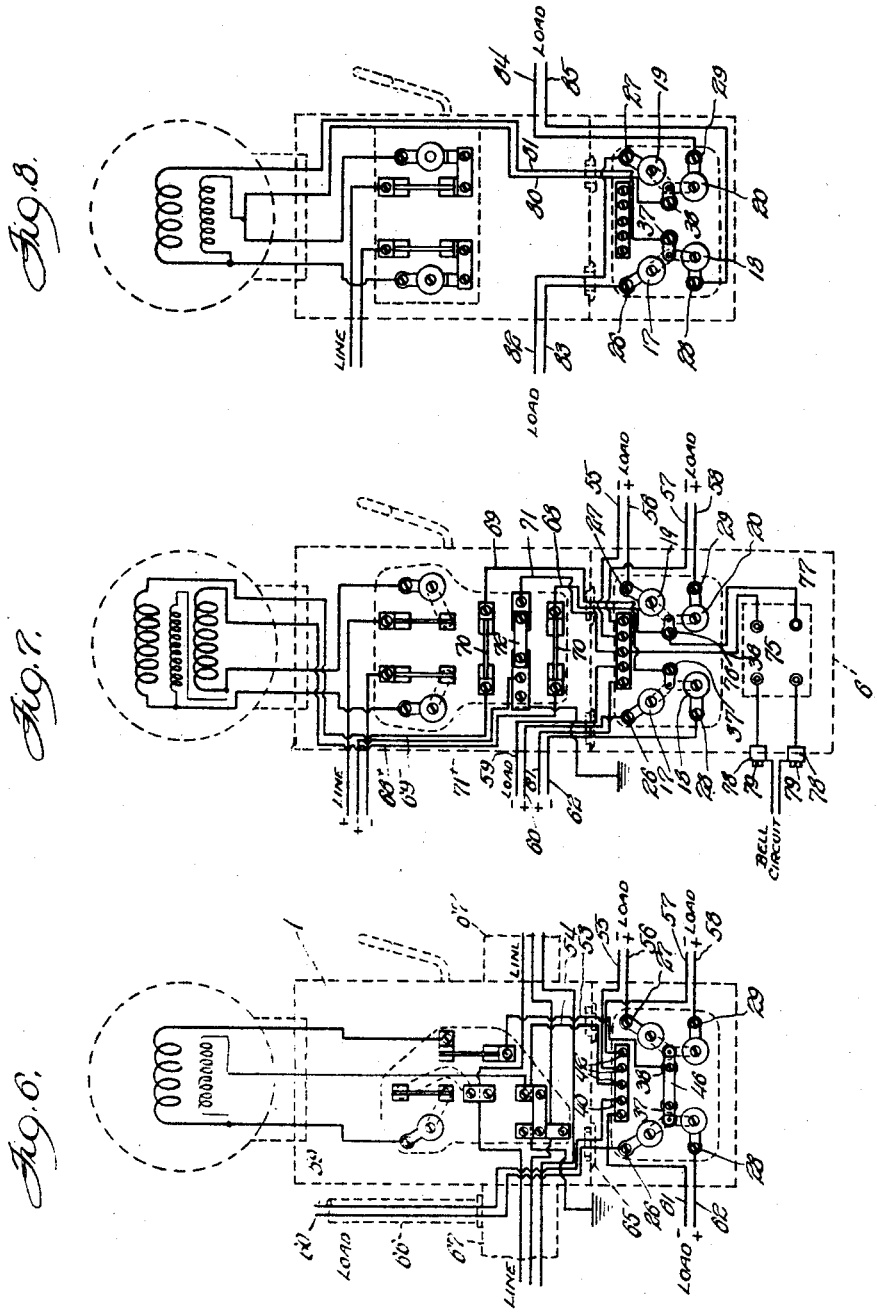

Patented Feb. 10, 1931

1,792,425

UNITED STATES PATENT OFFICE

BRYSON D. HORTON, OF DETROIT, MICHIGAN, ASSIGNOR TO SQUARE D COMPANY, OF DETROIT, MICHIGAN, A CORPORATION OF MICHIGAN

BRANCH FUSED CUT-OUT BLOCK

Original application filed February 23, 1924, Serial No. 694,656. Divided and this application filed September 26, 1925. Serial No. 58,699.

My invention relates to electrical service installations wherein a distributing center is employed to supply electric service to a number of branch load circuits, and more particularly to a branch fused cut-out block having a plurality of load fuses and terminals for connecting the load circuits to the line circuit.

In my co-pending application Serial Number 694,656, filed February 23, 1924, of which the present application is a division, a service installation having the branch fused cut-out block, which comprises the subject matter of this application is disclosed. This service installation combines a service switch with an improved type of distributing center. As I have stated in my copending application, good engineering practice requires that the main line fuses should be rendered inaccessible, and preferably disposed in an iron clad enclosure of the service switch, access to which is prevented by normally locking or sealing the enclosure closed. Where the main line fuses are rendered inaccessible, the National Electrical Code requires the use of auxiliary fuses in the customer's load which are so positioned that convenient access thereto may be readily had, and moreover, these auxiliary fuses are to remain unsealed but are to be provided in a metal enclosure. On the other hand, it is common practice to omit fuses on the grounded neutral wire where the latter is carried to the shell of the lamp socket. It will be immediately apparent, when considering the requirements of such practice, that new improvements in electrical service installation will result, and these improvements extend to the branch fused cut-out block in the distributing center. Heretofore, where the contractor has been obliged to obtain these units as individual parts, he may now secure them as standard equipment in the form of a unitary structure. Not only will the service switch enclosure be combined with the distributing center, but the latter will include a bell ringing transformer as part of the equipment, thereby overcoming the necessity for the contractor to run a separate circuit to the transformer and place the transformer wherever convenient.

Being a division of my co-pending application, the present application is directed to an improved type of branch fused cut-out block which is extremely efficient, simple and inexpensive to manufacture.

An object of my invention, therefore, is to provide a branch fused cut-out block having a plurality of fuse receptacles, so located with respect to a neutral bus bar that the branch load wires may be led in practically any direction from the block, and each branch circuit may embody but a single fuse receptacle, preferably in the live wire of the circuit. To the neutral bus bar will be run the neutral wire of the line circuit and from this bus bar each neutral wire of the branch circuits will be taken and run to the load circuit, while the other side of the line will run to a common terminal connecting the fuse receptacles so that the live side of each branch circuit will extend from one of these fuse receptacles.

A further object of my invention is the provision of a branch fused cut-out block of the above general type having means for quickly converting the device from a two wire to a three wire service, or vice versa.

Other objects and advantages of my invention reside in the novel form of construction, as well as in the manner of arranging the terminals and conductor straps upon the block, further objects and advantages being apparent from the following detailed description and accompanying drawings forming a part hereof:

In the drawings:

Figure 1 is a top plan view of a branch fused cut-out embodying my invention;

Fig. 2 is a cross sectional view taken on line 2—2 of Fig. 1;

Fig. 3 is a similar view taken on line 3—3 of Fig. 1;

Fig. 4 is also a similar view but taken on line 4—4 of Fig. 1;

Fig. 5 is a top plan view of a cut-out block provided with a dead front construction to conceal the live parts on the block and to render the front thereof dead;

Fig. 6 is a wiring diagram embodying my improved branch fused cut-out in a two to two-wire gang installation, having three feeders;

Fig. 7 is a wiring diagram embodying my invention in a three to two-wire electric wiring system; and Fig. 8 is a still further form of wiring diagram in which my improved invention may be embodied, the wiring thereof being unidentified, but employing a two to two-wire electric wiring system.

The branch cut-out 5 comprises an insulating base 16, composed of any suitable insulating compound, on which are mounted the desired fuse receptacle terminals and their interconnections. In the preferred form of cut-out, herein illustrated, fuse receptacles adapted to receive the Edison plug fuses are represented, but obviously any other type of fuse could be utilized.

On the base 16, in the preferred embodiment, are positioned Edison plug fuse receptacles 17, 18, 19 and 20. Each of these fuse receptacles comprises a threaded shell contact 21 and a center contact 22. The center contact 22 consists of a flat headed screw which rides a metallic washer 23, the washer 23 resting on an insulating washer 24, which in turn rests upon a metallic extension of a conducting bar 25. This extension is in direct contact with the base portion of the threaded shell contact 21. Obviously, any other construction of Edison plug fuse receptacle, or any other type, could be readily utilized. The conducting bars 25 of each fuse receptacle terminate in wire receiving terminals 26, 27, 28 and 29.

The center contact screws 22 of the fuse receptacles are threaded into metallic conducting bars 30 and 31, positioned in suitable recesses 32 and 33 fitted in the rear face of mounting base 16. The conducting bars 30 and 31 are provided with a perforation through which screws 34 are fitted, which screws extend to the top face of the mounting base 16 and are there threaded into conducting bars 35 and 36 connected to wire terminals 37 and 38. From this construction it will be evident that the center contacts 22 of the fuse receptacles 17 and 18 are made common and interconnected by their conducting bars 30 and 31, which bars are connected to the common terminal 37.

Likewise, the center contacts 22 of the fuse receptacles 19 and 20 are made common and interconnected by their conducting bars 30 and 31, which bars are also connected to the common terminal 38.

A conducting bar 40 constituting a neutral bus is disposed at one side of base 16, and a plurality of wire terminals 42 are connected thereto. This neutral bus 40 will in all cases be connected in the grounded neutral side of a 3 or 2-wire circuit. A depression 43 of considerable depth is provided at one side of base 16 for receiving the neutral bus 40 (see Fig. 4), thus allowing space sufficient to prevent the short circuiting of the current between this bus and any of the other terminals on the base. As illustrated in Fig. 4, any suitable means may be provided to secure the bus 40 to the base. In the drawings, however, I have shown a depression 44' on the under side of the base 16 at one side through which a suitable bolt 44 may extend in an upward direction, so that its end will thread into the bus 40.

I wish to call attention to the particular design of base 16; of the arrangement of the various fuse receptacles; the wire receiving terminals 26, 27, 28 and 29; the removable strap 46; and the neutral bus 40, all of which are of such character that the branch cut-out will be of maximum capacity and efficiency, as well as being simple in design, and exceedingly cheap to manufacture.

The wire terminals 37 and 38 are so positioned on the mounting base 16 that the medial line of their associated conducting bars 35 and 36 are in substantial alignment, and consequently the wire terminals 37 and 38 are aligned to receive, when desired, the connecting link or removable strap 46. This connecting link or removable strap 46 is fitted with apertures at either end, adapted to receive the shanks of the screws 47 and 48 associated with the wire terminals 37 and 38 respectively, which screws serve to securely interconnect the removable strap with the respective conducting bars 35 and 36 of terminals 37 and 38. With the link 46 in position, as illustrated in Figs. 1 and 6, the cut-out is arranged for two-wire service, except in Fig. 6 where the two-wire service having three feeders is used; and with the link removed, as shown in Fig. 7, the cut-out is arranged for three-wire service, the branch circuits in such cases being arranged for two-wire service.

The branch cut-out may be secured within a distributing cabinet 6 in any suitable manner, but is preferably done by screws such as 50 and the cooperating washers 51, which fit in suitable depressions such as 52, positioned in the mounting base 16, so that the screws and washers will be positioned well below the top face of the mounting base 16.

If the branch cut-out is to be used with a two-wire service circuit having three feeders the connections are made as illustrated in the Fig. 6. Under these circumstances, as hereinbefore stated, the removable strap 46 is retained in position by the wire terminals 37 and 38, thereby interconnecting these two terminals and the center contacts 22 of all the receptacles.

One lead of the service circuit, coming from the service switch, such as 53, is then connected to either the terminal 37, or the terminal 38, and the other lead 54 of the service circuit is connected to the center terminal 42 on the neutral bus 40.

In view of the use of the neutral bus strap 40 and a single fuse in each branch circuit, this fuse being in the live wire of the circuit, this particular arrangement of the cut-out permits four branch circuits to be fed therefrom.

One lead 55 of the fuse branch circuit is connected to the first wire terminal 42, to the right of the center wire terminal on the neutral bus 40, and the other lead 56 of that branch circuit is connected to the wire terminal 27. In a like manner one lead 57 of the second branch circuit is connected to the second wire terminal 42, to the right of the center wire terminal on the neutral bus 40; and the other lead 58 of that branch circuit is connected to the other wire terminal 29. As for the third branch circuit the neutral lead 59 is connected to the first wire terminal 42 on the left-hand side of the center wire terminal on the neutral bus 40, and the other lead 60 of the same branch circuit is connected to the wire terminal 26. The fourth branch circuit has one of its leads 61 connected to the extreme left-hand terminal 42 on the neutral bus 40, and the other lead of this branch circuit is connected to the wire terminal 28.

When the branch fuse cut-out is thus connected, power from the service circuit, through the service switch, will be delivered to the four branch circuits over circuits which may be traced as follows.

Current will flow from the service lead 53 to the terminal 37 or 38, thence through the conducting bar 36, at which place the current will be divided to flow in two different directions for supplying two branch circuits. In one instance, the current will flow through the conducting bar 31 to the center contact 22 of the receptacle 19, through the fuse plug to the threaded shell contact 21, thence through the conducting bar 25 to the wire terminal 27, and out over the branch circuit lead 56, through the branch circuit and back over the opposite branch circuit wire 55 to the wire terminal 42 on the neutral bus 40, to which is connected the opposite service lead 54.

· In the other instance, the current flows through the conducting bar 30 to the center contact 22 of the receptacle 20, through the fuse plug to the threaded shell contact 21, thence through the conducting bar to the terminal 29 and out over the branch circuit lead 58 through the branch circuit and back over the opposite branch circuit wire 57 to the other wire terminal 42 on the neutral bus 40, the current returning through the opposite service lead 54 to the service circuit.

For the branch circuits on the opposite side of the block, the current flows across the interconnecting link 46 to the terminal 37, where it is likewise divided for delivering current to the remaining two branch circuits. The current flows over these two branch circuits in substantially the same manner as described in connection with the first two branch circuits. It is, therefore, deemed unnecessary to repeat the tracing of the current over branch circuit wires 59 and 60, and 61 and 62.

The position of the neutral bus 40 and the two wire terminals 27 and 29 permit two branch circuits to be taken off the fuse cut-out on the right-hand side of the installation without requiring the leads of these branch circuits to cross each other on the outside of the installation in order to be led in the proper direction over the distributing system.

In like manner the two opposite branch circuits will be led directly from the distributing cabinet 6; and one of both of them may be led back into the switch enclosure 1, through suitable porcelain bushed knockouts 65, from which switch enclosure 1 they may then be led through conduits 66 connected to the interconnecting troughs 67, as illustrated in Fig. 6.

When the service circuit is of the three-wire type, the interconnecting link 46 is removed and the apparatus is wired as illustrated in Fig. 7. In this instance, the positive wire 68 of the three-wire circuit is connected to the wire terminal 38 (through a suitable meter load disconnecting switch 70 positioned between the meter and the branch circuits), thence to both fuse receptacles 19 and 20, terminals 27 and 29, respectively, and out over the branch circuit leads 56 and 58, through the two branch circuits, and back over the opposite leads 55 and 57, to the respective wire terminals 42 on the neutral bus 40. The neutral wire 71 passes through a connection 72 on the service switch and connects to the center wire terminal 42 on this neutral bus 40.

The negative wire 69 of this three-wire circuit is connected through a similar meter load disconnecting switch 70, to the terminal 37, where the current is divided, flowing through the fuse receptacles 17 and 18, to the wire terminals 26 and 28, respectively, and out over the branch circuit leads 60 and 62, through the branch circuit, and out over the two opposite leads 59 and 61, and to the respective wire terminal 42 on the neutral bus 40.

The distributing cabinet 6, employed in the embodiment illustrated in Fig. 7, is adapted to carry a bell transformer 75. The leads 76 and 77 of the primary circuit of this transformer 75 may be connected to one of the wire terminals 42, and to either one of the terminals 37 or 38. Suitable porcelain bushings 78, provided with the proper wire connections 79, are fitted in one side of the cabinet 6, so that all that remains to be done by workmen on the job is to run the bell circuit wires from these connections 79 on the cabinet to the bell.

The primary connections 76 and 77 will be made by the manufacturer and consequently, it will not be necessary for the contractor to install a separate circuit which must be run to the transformer, as is now the practice.

The transformer 75 is enclosed in a metal case, being a part of the distributing center housed within the distributing cabinet 6.

The embodiment shown in Fig. 8 illustrates an electrical distributing system involving a two-wire service, having its wires unidentified and supplying but two branch circuits. One of the service leads 80 is connected to the wire terminal 38, and the other service lead is connected to the wire terminal 37. In this instance the link 46 is removed and no connections to the neutral bus 40 are made.

As before explained, the code permits the omission of fuses in branch circuits on the neutral side only where the neutral wire is identified throughout the circuits. If the neutral wire is unidentified, as illustrated in Fig. 8, the neutral bus is preferably not used.

The fuse receptacles 17 and 19 are positioned in the opposite sides of one of the branch circuits, these circuits being identified by the lead wires 82 and 83, and the fuse receptacles 18 and 20 are positioned in the opposite sides of the other branch circuit, which is designated by the leads 84 and 85.

These circuits may be traced as follows:

From the service lead 80 the current will flow to the terminal 38 and there be divided, going one way through the fuse receptacle 19 to the terminal 27, and over the branch circuit by way of the branch circuit lead 82, and return by way of the opposite branch circuit lead 83, to the terminal 26, through the fuse receptacle 17, and conducting bar 31, to the terminal 37, and back to the service switch by means of the service wire 81.

At the terminal 38 the current will also flow through the conducting bar 30 to the fuse 20, the terminal 29, and over the branch circuit, through the branch circuit lead 84, returning by way of the opposite branch circuit lead 85 to the terminal 28, through the fuse receptacle 18 and conducting bar 30, to the terminal 37 and back to the service circuit over the wire 81.

I have hereinbefore referred to the branch fuse cut-out block 5 as having a maximum capacity. This is in reference to the number of branch circuits capable of being fed from a block having a base of the size shown.

The arrangement of the wire connecting terminals, fuse receptacles, terminals 37 and 38 and the neutral bus 40 enter into the accomplishment of this feature. The terminals are spaced a maximum distance apart, with sufficient air-spaces therebetween to prevent short circuiting of the current. In this connection, the neutral bus 40 is sunk in a recess 43, preferably of maximum depth. The fuse receptacle are also sunk in recesses spaced, or separated, by the upstanding projection 90 formed integrally with base 16, which is of insulating material. To prevent the branch circuit wires within the cabinet 6 from dropping over and upon a terminal other than the one to which it connects, recesses 91 at the four corners of the block are provided, and in these recesses the branch circuit wires are led and guided. To prevent the wires of the two upper branch circuits from contacting with and short circuiting the current across the common neutral bus 40, upstanding insulating barriers 92 are formed integral with the base between the fuse receptacles 17 and 19 and the neutral bus 40.

The front of the base 16 is preferably rendered dead by means of a dead front construction, comprising an insulating plate 95, suitably secured at 96 to the base 16. Insulating plate 95 is provided with a plurality of apertures 97 through which the fuses 17′, 18′, 19′ and 20′ are inserted for attachment to the fuse receptacles 17 to 20, inclusive. Thus these fuses are accessible and may be changed without necessarily removing the plate 95. It is desirable to permit the plate 95 to protrude about edges of the base 16 a distance sufficient to prevent contact with the live parts on the base.

All the fuse receptacles and live parts are, in reality, embedded in the insulating base 16, and do not protrude from either the front or the rear of the base, thereby permitting the plate 95 to fit closely against the front face and provide an inexpensive form of dead front for the device shown herein. It is considerably cheaper than forms heretofore used, say, for instance, where insulation material is moulded especially to fit over one-half of the base and form the other half to cover protruding fuse receptacles and terminals. It will be observed that the branch load wire terminals 26, 27, 28 and 29 are in substantially the same plane as that of the lower portion of the fuse receptacles, and that the upper portion of these fuse receptacles are below the front face of base 16. Insulating barriers 92, together with surface 100, form the flat front face against which the plate 95 is secured.

It is believed that the structural principles underlying this invention, its fundamental theory and the merits and advantages it possesses will be clear to those skilled in the art without further detailed description or elaboration of other equivalent specific forms in which the invention may find expression. Hence, without limiting the invention to any or all of the particular embodiments thereof, herein selected for purposes of illustration and description.

I claim:

1. In a device of the character described, a base member, center and shell contacts for four fuse receptacles positioned on said base member, corresponding load terminals at the corners of said base member connecting with said shell contacts, a bus bar on the top face of said base member having wire connecting terminals near the ends thereof, means for connecting said center contacts with said wire connecting terminals from the under side of said base member, and a second bus bar on said base member provided with a plurality of wire connecting terminals.

2. In a device of the character described, a base member, center and shell contacts for fuse receptacles associated with said base member, corresponding load terminals on said base member in close proximity to said receptacles and connecting to said shell contacts, a bus bar on the upper side of said base member having wire connecting terminals associated therewith, means for connecting said center contacts with said wire connecting terminals from the underside of said base member so that a single fuse plug inserted in each receptacle will be in a separate load circuit, and a common bus bar mounted on said base member having wire connecting means for the other side of each load circuit.

3. In a device of the character described, a base member, center and shell contacts for fuse receptacles mounted on said base member, a bus bar on the upper side of said base member adapted for connection to said center contacts, a second bus bar having wire connecting terminals adapted for connection with a plurality of load circuits, each having one side only connected to said terminals, and a plurality of load terminals one for each shell contact and to which the opposite side of each load circuit is connected.

4. In a device of the character described, a base member, center and shell contacts for fuse receptacles mounted on said base member, a pair of line terminals extending through said base member and connecting to said center contacts below said base member, a bus bar having a plurality of wire connecting terminals associated therewith, one for each load circuit connected to said base member, and interchangeable means adapted for interconnection across said line terminals whereby a two or three wire system may be eventuated, as desired, with a single fuse receptacle in each load circuit.

5. In a device of the character described, a base member, center and shell contacts for fuse receptacles mounted on said base member, said receptacles being mounted at the corners of said base members, load terminals also at said corners connecting to said shell contacts, a pair of line terminals having extensions running through said base member to the underside for connection with said center contacts, each line terminal connecting to the center contacts of two fuse receptacles, an interchangeable bus bar adapted for interconnection with said line terminals whereby a two or three wire system may be eventuated, as desired, and a second bus bar having a common connection for the other side of each load circuit.

6. In a device of the character described, a base member, center and shell contacts for fuse receptacles mounted on said base member, said center and shell contacts being recessed below the upper face of said base member, a load terminal connected to each shell contact in substantially the same plane as that of the lower edges of the shell contacts, a bus bar interconnecting all of the center contacts of said fuse receptacles, a second bus bar disposed in a recess at one side of said base member, and a plurality of wire connecting terminals on said second bus bar.

7. In a device of the class described, a base member having a plurality of receptacles comprising shell and center contacts associated therewith, means on said base admitting of the connection of the center contacts of all of said receptacles, said means including a bus bar and line terminals to which the bus bar is connected, a second bus bar to which the other side of the line circuit is connected, and a plurality of branch load circuit terminals associated with said shell contacts and said second bus bar whereby a fuse receptacle is included in one side only of each branch load circuit.

8. In a device of the class described, a base member having a plurality of receptacles comprising shall and center contacts associated therewith, means carried by said base member admitting of the connection of the center contacts of all of said receptacles, a branch load circuit terminal associated with each receptacle for receiving one side of each branch load circuit, and a bus bar common to all of the branch circuits for receiving the other side of each branch load circuit whereby the latter each have but a single fuse receptacle only in one side thereof.

9. In a device of the class described, a base member having a plurality of fuse receptacles mounted thereon and below the upper side thereof, line connecting terminals on the front thereof but also recessed below said upper side, means extending through said base member into recesses in the rear of said base member, contact strips disposed in said recesses and arranged to interconnect the center contacts of said receptacles with said line terminals, other terminals in recesses in the front of said base member, said other terminals lying in approximately the same plane with the inner portion of said receptacles, and a common terminal bus bar in a different recess in the front of said base member for providing an unfused connection for one side of each branch circuit having one of said fuse receptacles in the other side.

10. In a device of the class described, a base member having a plurality of fuse receptacles countersunk in the front face of said base member, line terminals mounted on said front face of the base member, means for interconnecting the center contacts of said receptacles with said line terminals, a load circuit terminal adjacent to each receptacle and recessed in said base member so as to be in substantially the same plane as that of the inner portion of the receptacle, and a common terminal bus bar for receiving the other side of both the line circuit and the load circuits.

11. In a device of the class described, a base member having a plurality of fuse receptacles associated therewith, means for connecting a branch load circuit connection to each receptacle to provide a fused connection for one side of each branch load circuit, a common terminal bus bar for providing an unfused connection for the neutral side of each branch load circuit, a line terminal connection for said bus bar, other line terminal connections mounted on said base member and adapted for connection to said receptacles, and means associated with said last line terminal connections which provides for accommodating either a two or three wire system, as desired.

12. In a branch fuse cut-out adapted for interconnection in two or three wire electric distributing systems for supplying four two wire branch circuits, in combination, an insulating base, apparatus on said base, said apparatus including a fuse receptacle for one side only of each branch circuit and a common neutral bus for the opposite side of each branch circuit, and interconnecting means adapted to make common all of said fuse receptacles.

In witness whereof, I have hereunto subscribed my name.

BRYSON D. HORTON.